United States Patent
Kim et al.

(10) Patent No.: US 10,068,860 B2
(45) Date of Patent: Sep. 4, 2018

(54) LASER DETECTOR USING LATCH AND SEMICONDUCTOR DEVICE INCLUDING THE SAME

(71) Applicant: Samsung Electronics Co., Ltd., Suwon-si (KR)

(72) Inventors: Kwang Ho Kim, Yongin-Si (KR); Sang Ho Kim, Suwon-si (KR)

(73) Assignee: Samsung Electronics Co., Ltd. (KR)

( * ) Notice: Subject to any disclaimer, the term of this patent is extended or adjusted under 35 U.S.C. 154(b) by 76 days.

(21) Appl. No.: 15/010,520

(22) Filed: Jan. 29, 2016

(65) Prior Publication Data

US 2016/0225725 A1   Aug. 4, 2016

(30) Foreign Application Priority Data

Feb. 2, 2015   (KR) ......................... 10 2015 0016167

(51) Int. Cl.
| | |
|---|---|
| G06K 19/073 | (2006.01) |
| G06K 7/10 | (2006.01) |
| H01L 27/14 | (2006.01) |
| H01L 23/00 | (2006.01) |
| H01L 31/00 | (2006.01) |
| H01L 31/02 | (2006.01) |
| G06F 21/70 | (2013.01) |

(52) U.S. Cl.
CPC ........ *H01L 23/576* (2013.01); *G06K 7/10257* (2013.01); *G06K 19/07363* (2013.01); *H01L 27/14* (2013.01); *H01L 31/00* (2013.01); *G06F 21/70* (2013.01); *H01L 2924/1434* (2013.01)

(58) Field of Classification Search
CPC ... G06F 21/70–21/75; G06K 19/07363; G06K 7/10257–7/10267; G11C 7/24
See application file for complete search history.

(56) References Cited

U.S. PATENT DOCUMENTS

| | | | | |
|---|---|---|---|---|
| 4,733,961 A | * | 3/1988 | Mooney ................ | G01S 7/4813 250/342 |
| 5,557,582 A | * | 9/1996 | Kawamoto .......... | G11C 7/1051 365/189.05 |
| 5,923,613 A | * | 7/1999 | Tien ........................ | G11C 7/22 327/261 |
| 5,999,447 A | * | 12/1999 | Naura ...................... | G11C 7/24 365/185.04 |
| 6,005,797 A | * | 12/1999 | Porter ................... | G11C 11/412 257/370 |
| 6,122,220 A | * | 9/2000 | Kim ........................ | G11C 7/22 327/261 |

(Continued)

FOREIGN PATENT DOCUMENTS

JP    2010033626    2/2010

*Primary Examiner* — Maliheh Malek
(74) *Attorney, Agent, or Firm* — Onello & Mello, LLP

(57) ABSTRACT

A laser detector includes a latch and a semiconductor device including the same. The laser detector includes a latch configured to output an output signal and an inverted output signal and an initial value setting circuit configured to set an initial value of at least one of the output signal and the inverted output signal. The latch includes a first transistor controlled to be initially turned on by the initial value and a second transistor controlled to be initially turned off by the initial value. The second transistor has an active region having a lateral area that is greater than that of the first transistor.

16 Claims, 15 Drawing Sheets

(56) References Cited

U.S. PATENT DOCUMENTS

| | | | |
|---|---|---|---|
| 7,748,637 B2 | 7/2010 | Na et al. | |
| 7,847,581 B2 | 12/2010 | Lisart et al. | |
| 7,965,116 B2* | 6/2011 | Hatano | H03L 7/0805 327/149 |
| 7,990,359 B2* | 8/2011 | Lim | G09G 3/3406 345/102 |
| 8,350,574 B2 | 1/2013 | Nobukata | |
| 8,488,360 B2 | 7/2013 | Okuda | |
| 8,766,705 B2 | 7/2014 | Amanuma et al. | |
| 2002/0176067 A1* | 11/2002 | Charbon | G01C 3/08 356/3.01 |
| 2006/0007971 A1* | 1/2006 | Sato | H01S 5/062 372/38.02 |
| 2006/0273244 A1* | 12/2006 | Razavi | H01L 27/144 250/214 R |
| 2007/0057698 A1* | 3/2007 | Verbauwhede | G06Q 20/341 327/52 |
| 2009/0013415 A1* | 1/2009 | Lee | G06F 21/86 726/34 |
| 2009/0066432 A1* | 3/2009 | Koyama | H03K 3/014 331/175 |
| 2009/0113546 A1 | 4/2009 | Kim et al. | |
| 2009/0168562 A1* | 7/2009 | Tsunetou | G11C 7/24 365/191 |
| 2009/0296178 A1* | 12/2009 | Watanabe | H03K 19/17748 359/107 |
| 2010/0226495 A1* | 9/2010 | Kelly | G11B 20/00086 380/30 |
| 2011/0128030 A1* | 6/2011 | Wuidart | H04L 9/003 324/762.01 |
| 2013/0200371 A1 | 8/2013 | Marinet et al. | |
| 2013/0314121 A1 | 11/2013 | Mougin et al. | |
| 2014/0077835 A1 | 3/2014 | Amanuma et al. | |
| 2014/0111230 A1 | 4/2014 | Lisart et al. | |
| 2015/0178143 A1* | 6/2015 | Mathew | G06F 11/0793 714/5.1 |
| 2015/0294943 A1* | 10/2015 | Kuenemund | H01L 23/576 326/8 |
| 2015/0294944 A1* | 10/2015 | Kuenemund | H01L 23/573 326/8 |
| 2015/0303927 A1* | 10/2015 | Kuenemund | H03K 19/215 326/8 |
| 2015/0311202 A1* | 10/2015 | Kuenemund | H03K 19/00315 257/369 |
| 2016/0028245 A1* | 1/2016 | Von Novak | H02J 5/005 307/104 |
| 2016/0218071 A1* | 7/2016 | Nam | H01L 28/91 |
| 2017/0357829 A1* | 12/2017 | Park | H03K 5/24 |

* cited by examiner

LASER DETECTOR USING LATCH AND SEMICONDUCTOR DEVICE INCLUDING THE SAME

CROSS-REFERENCE TO RELATED APPLICATIONS

This application claims priority under 35 U.S.C. § 119(a) from Korean Patent Application No. 10-2015-0016167 filed on Feb. 2, 2015, the disclosure of which is hereby incorporated by reference in its entirety.

BACKGROUND

Embodiments of the inventive concepts relate to a laser detector and a semiconductor device (e.g., a memory device or a system on chip (SoC)) including the same, and more particularly, to a laser detector using a latch and a semiconductor device including the same.

With the development of computer technology, hacking techniques for illegally accessing, harming or damaging stored information continue to increase in sophistication. There are many different forms of hacking techniques. Often times, a laser is used in the illegal process. Accordingly, laser detector circuits have been employed as a mechanism for detecting whether a laser attack or hacking has occurred.

A laser detector circuit commonly employs a flip-flop. However, such a laser detector often times has a low detection likelihood. In addition, such flip-flip-based laser detectors can occupy a relatively large circuit region. Moreover, with the ongoing development of micro-scale semiconductor processes, it is becoming ever-increasingly difficult to detect a laser attack.

SUMMARY

According to some embodiments of the inventive concepts, there is provided a laser detector for detecting a laser attack. The laser detector includes a latch including a first inverter configured to invert an inverted output signal to generate an output signal and a second inverter configured to receive the output signal and to generate the inverted output signal; and an initial value setting circuit configured to set an initial value of at least one of the output signal and the inverted output signal. The first inverter includes a first transistor controlled to be initially turned off by the initial value and a second transistor controlled to be initially turned on by the initial value. The second inverter includes a third transistor controlled to be initially turned on by the initial value and a fourth transistor controlled to be initially turned off by the initial value.

The first and third transistors may comprise P-channel metal oxide semiconductor (PMOS) transistors and the second and fourth transistors may comprise N-channel metal oxide semiconductor (NMOS) transistors.

A ratio of width to length of an active region of the first transistor may be greater than a ratio of width to length of an active region of the third transistor and a ratio of width to length of an active region of the second transistor may be less than a ratio of width to length of an active region of the fourth transistor.

An active region of each of the second and third transistors may be positioned to be covered in a vertical direction by a metal layer and at least a portion of an active region of each of the first and fourth transistors may be positioned to not be covered in a vertical direction by the metal layer.

The first transistor may be connected between a first power supply voltage and a first node and may have a gate receiving the inverted output signal. The second transistor may be connected between the first node and a second power supply voltage and may have a gate receiving the inverted output signal. The third transistor may be connected between the first power supply voltage and a second node and may have a gate receiving the output signal. The fourth transistor may be connected between the second node and the second power supply voltage and may have a gate receiving the output signal.

The initial value setting circuit may include a transistor connected between the first or second node and the second power supply voltage to operate in response to a reset signal.

According to other embodiments of the inventive concept, there is provided a laser detector for detecting a laser attack. The laser detector includes a latch configured to output an output signal and an inverted output signal and an initial value setting circuit configured to set an initial value of at least one of the output signal and the inverted output signal. The latch includes a first transistor controlled to be initially turned on by the initial value and a second transistor controlled to be initially turned off by the initial value. An active region of the second transistor may have a lateral area that is greater than that of the first transistor.

A ratio of width to length of an active region of the second transistor may be greater than a ratio of width to length of an active region of the first transistor.

An active region of the first transistor may be positioned to be covered with in a vertical direction by a metal layer and at least a portion of an active region of the second transistor may be positioned to not to be covered in a vertical direction by the metal layer. The first transistor may not react to an incident laser energy. The second transistor may react to the incident laser energy and generate a leakage current to invert the output signal having the initial value.

The second transistor may include at least two transistors connected in parallel to be larger in size than the first transistor.

The first transistor may include at least two transistors connected in series to be smaller in size than the second transistor.

According to still other embodiments of the inventive concept, there is provided a semiconductor device including first through k-th laser detectors, where "k" is an integer of at least 2; and a logical operator configured to perform a logical operation on first through k-th output signals of the respective first through k-th laser detectors to generate a laser detection signal. Each of the first through k-th laser detectors includes an initial value setting circuit configured to set an initial value of one of the output signals and a latch configured to initially latch the initial value and invert the output signal in response to incident laser energy. The latch includes a first transistor controlled to be initially turned on by the initial value and a second transistor controlled to be initially turned off by the initial value. An active region of the second transistor may have a lateral area that is greater than that of the first transistor.

The logical operator includes at least one OR logical operator configured to perform an OR operation on the first through k-th output signals or an AND logical operator configured to perform an AND operation on the first through k-th output signals.

The semiconductor device may further include a memory cell array including a plurality of memory cells configured to store data of at least one bit. The first through k-th laser detectors may be positioned within or around the memory cell array in a distributed fashion.

According to further embodiments of the inventive concept, there is provided an electronic system including a processor and a memory device configured to store data used by the processor. At least one among the processor and the memory device includes a latch configured to latch an initial value and to invert the initial value in response to incident laser energy to detect the laser energy.

According to further embodiments of the inventive concept, there is provided an laser detector comprising: a latch configured to latch an output signal and an inverted output signal; and an initial value setting circuit configured to set an initial value of the output signal of the latch. The latch comprises: a first transistor constructed and arranged so that an on/off state of the first transistor is one of on or off in response to the initial value; and a second transistor constructed and arranged so that an on/off state of the second transistor is the other of on or off in response to the initial value. The first transistor retains its on/off state when subjected to incident laser energy and the second transistor changes its on/off state by generating a leakage current when subjected to the laser energy.

An active region of the first transistor may be positioned to be covered in a vertical direction by a metal layer so that incident laser energy is blocked by the metal layer and at least a portion of an active region of the second transistor may be positioned to not be covered in a vertical direction by the metal layer so that incident laser energy passes through the metal layer.

The active region of the second transistor may be larger than the active region of the first transistor.

The second transistor may comprise may be least two transistors in parallel.

The first transistor may comprise may be least two transistors in series.

The latch may comprise first and second inverters. The first inverter may comprise the first transistor controlled to be initially turned on by the initial value; and a third transistor controlled to be initially turned off by the initial value. The second inverter may comprise the second transistor controlled to be initially turned off by the initial value; and a fourth transistor controlled to be initially turned on by the initial value.

BRIEF DESCRIPTION OF THE DRAWINGS

The above and other features and advantages of the inventive concepts will become more apparent by describing in detail exemplary embodiments thereof with reference to the attached drawings in which.

DETAILED DESCRIPTION OF EMBODIMENTS

Figure 1:
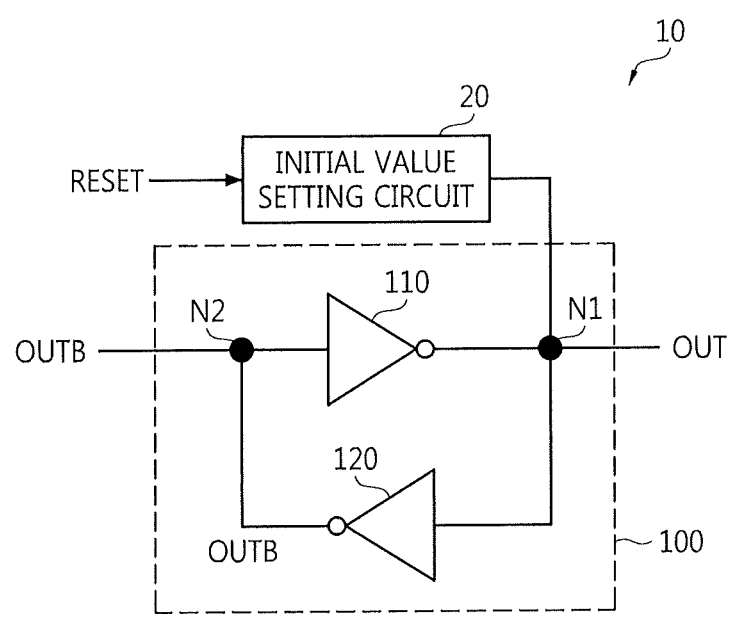
FIG. 1 is a schematic block diagram of a laser detector according to some embodiments of the inventive concepts.

The inventive concepts will now be described more fully hereinafter with reference to the accompanying drawings, in which embodiments are shown. The inventive concepts may, however, be embodied in many different forms and should not be construed as limited to the embodiments set forth herein. Rather, these embodiments are provided so that this disclosure will be thorough and complete, and will fully convey the scope to those skilled in the art. In the drawings, the size and relative sizes of layers and regions may be exaggerated for clarity. Like numbers refer to like elements throughout.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. As used herein, the term "and/or" includes any and all combinations of one or more of the associated listed items and may be abbreviated as "/".

It will be understood that, although the terms first, second, etc. may be used herein to describe various elements, these elements should not be limited by these terms. These terms are only used to distinguish one element from another. For example, a first signal could be termed a second signal, and, similarly, a second signal could be termed a first signal without departing from the teachings of the disclosure.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and/or the present application, and will not be interpreted in an idealized or overly formal sense unless expressly so defined herein.

FIG. 1 is a schematic block diagram of a laser detector 10 according to some embodiments of the inventive concepts. The laser detector 10 includes a latch 100 and an initial value setting circuit 20. The initial value setting circuit 20 sets an initial value of the latch 100. The latch 100 initially latches the initial value set by the initial value setting circuit 20 as an output signal (or as an inverted output signal) and responds to a laser attack by inverting the output signal. The inverted output signal of the laser detector can be sensed by sensing circuitry and the determination of whether a laser attack has occurred can be reached by the system. In some embodiments, the latch 100 may include a first inverter 110 and a second inverter 120.

In the present embodiment, an output node N1 of the first inverter 110 is connected to an input of the second inverter 120. An output node N2 of the second inverter 120 is connected to an input of the first inverter 110. The first inverter 110 generates an output signal OUT. The second inverter 120 inverts the output signal OUT of the first inverter 110 to generate an inverted output signal OUTB. The inverted output signal OUTB is provided as an input signal for the first inverter 110.

In the embodiment depicted in FIG. 1, the initial value setting circuit 20 sets an initial value of at least one of the output signal OUT and the inverted output signal OUTB of the latch 100 in response to a reset signal RESET. Although the initial value setting circuit 20 in the embodiment of FIG. 1 is shown as being connected to the first node N1 and setting the initial value of the output signal OUT of the latch 100, in other embodiments, the initial value setting circuit 20 may be connected to the second node N2 and can be responsible for instead setting an initial value of the inverted output signal OUTB of the latch 100. It will be apparent that both configurations are equally applicable to the principles of the inventive concepts.

Figure 2:
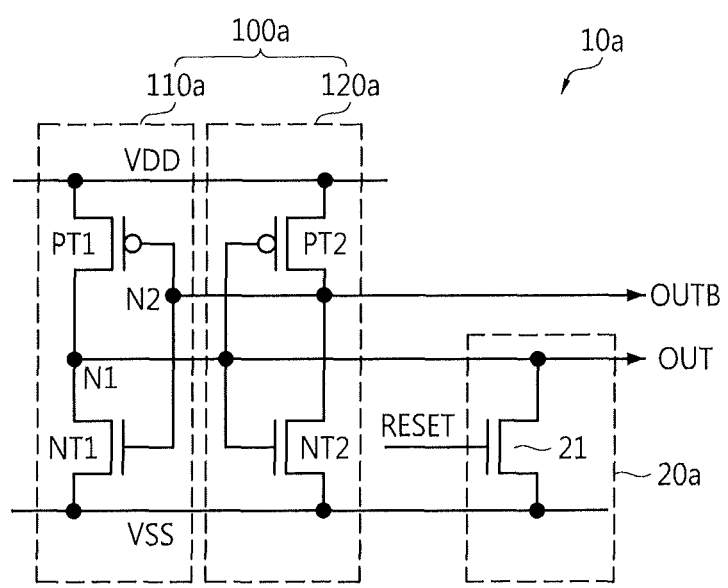
FIG. 2 is a circuit diagram of a laser detector according to some embodiments of the inventive concepts.

FIG. 2 is a circuit diagram of a laser detector 10a according to some embodiments of the inventive concepts. Referring to FIG. 2, the laser detector 10a includes a latch 100a and an initial value setting circuit 20a. The latch 100a includes a first inverter 110a and a second inverter 120a.

The first inverter 110a may include a first P-channel metal oxide semiconductor (PMOS) transistor PT1, which is connected between a first power supply voltage VDD and the first node N1 and has a gate receiving the inverted output signal OUTB, and a first N-channel metal oxide semiconductor (NMOS) transistor NT1, which is connected between the first node N1 and a second power supply voltage VSS and has a gate receiving the inverted output signal OUTB. The second inverter 120a may include a second PMOS transistor PT2, which is connected between the first power supply voltage VDD and the second node N2 and has a gate receiving the output signal OUT, and a second NMOS transistor NT2, which is connected between the second node N2 and the second power supply voltage VSS and has a gate receiving the output signal OUT. The first power supply voltage VDD may be a positive voltage and the second power supply voltage VSS may be a ground voltage of a voltage of 0 or less.

The initial value setting circuit 20a may include an NMOS transistor 21, which is connected between the first node N1 and the second power supply voltage VSS and has a gate receiving the reset signal RESET. The NMOS transistor 21 may be turned on in response to the reset signal RESET to initialize the output signal OUT to a low level (e.g., VSS).

Some transistors among the first and second PMOS transistors PT1 and PT2 and the first and second NMOS transistors NT1 and NT2 may be designed (or laid out) to increase reactivity to a laser and the other transistors may be designed (or laid out) to suppress the reactivity to the laser. For instance, some transistors among the first and second PMOS transistors PT1 and PT2 and the first and second NMOS transistors NT1 and NT2 may be designed to be increased in size, for example their active regions can be increased in size, to increase their reactivity to a laser and the other transistors may be designed to be decreased in size, for example their active regions can be decreased in size, to suppress their reactivity to a laser.

The first NMOS transistor NT1 and the second PMOS transistor PT2 are controlled to be initially turned on by the initial value setting circuit 20a and the first PMOS transistor PT1 and the second NMOS transistor NT2 are controlled to be initially turned off by the initial value setting circuit 20a. The first NMOS transistor NT1 and the second PMOS transistor PT2 initially controlled to be turned on may be smaller in size not to react to a laser while the first PMOS transistor PT1 and the second NMOS transistor NT2 controlled to be initially turned off may be larger in size to react well to the laser.

In order to adjust the relative sizes of the various transistors NT1, NT2, PT1, and PT2, the ratio of width to length (W/L) of an active region of each of the transistors NT1, NT2, PT1, and PT2 may be adjusted. The length and/or width of the active region of each transistor NT1, NT2, PT1, or PT2 may be adjusted to adjust the W/L ratio. In some embodiments, the ratio of the W/L of the active region of the first NMOS transistor NT1 to that of the second NMOS transistor NT2 may be 1:2 and the ratio of the W/L of the active region of the second PMOS transistor PT2 to that of the first PMOS transistor PT1 may be 1:2; however the inventive concepts are not restricted to those specific ratios, and other ratios may well apply to the principles of the inventive concepts.

In some embodiments, the first NMOS transistor NT1 and the second PMOS transistor PT2 may be laid out, or otherwise fabricated, to be covered with a metal layer so that their relative laser reaction sensitivity is minimized. In addition, the first PMOS transistor PT1 and the second NMOS transistor NT2 may be laid out to not be covered with a metal layer to increase their relative laser reaction sensitivity. Transistor layout embodiments are described herein, and particularly in connection with FIGS. 8 and 9.

Figure 3:
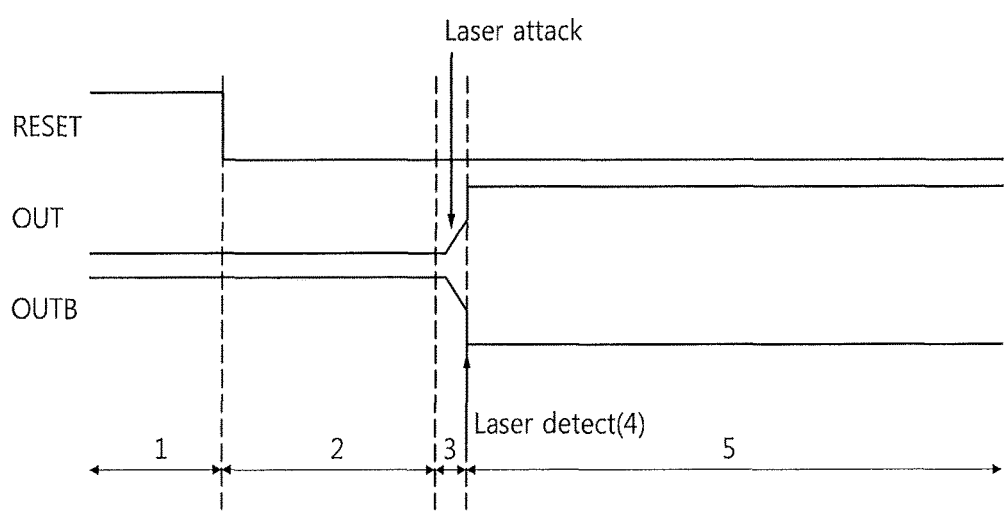
FIG. 3 is a schematic timing chart showing the operation of the laser detector illustrated in FIG. 2.
Figure 4:
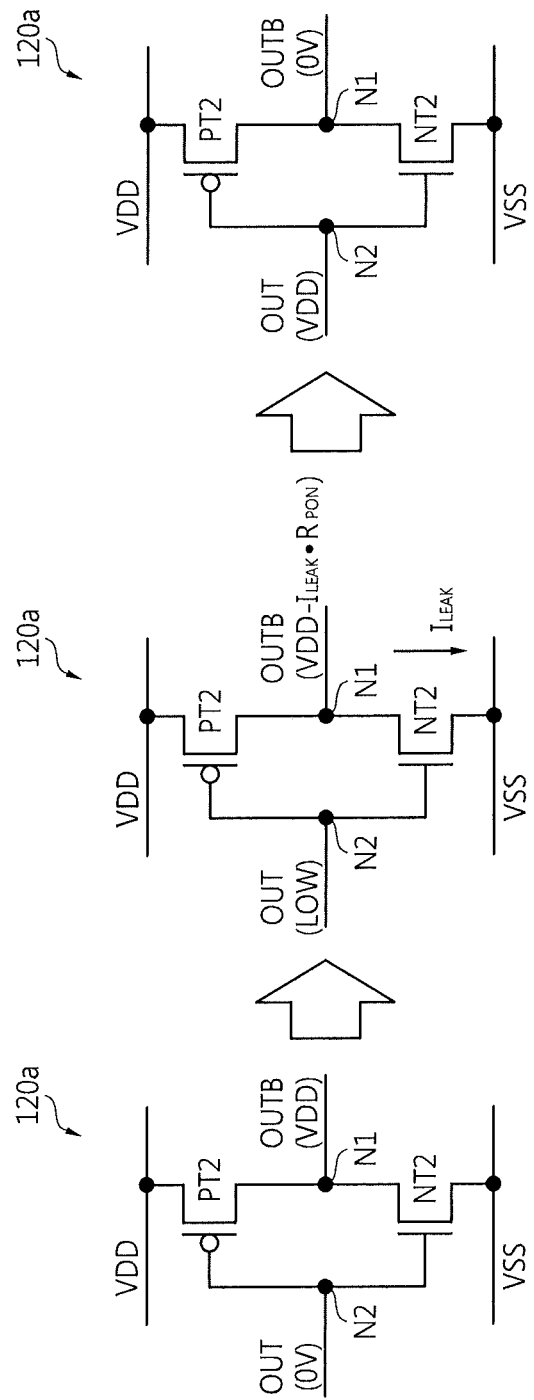
FIG. 4 is a diagram for explaining the operation of the laser detector illustrated in FIG. 2.

FIG. 3 is a schematic timing chart showing the operation of the laser detector 10a illustrated in FIG. 2. FIG. 4 is a diagram for explaining the operation of the laser detector 10a illustrated in FIG. 2.

Referring to FIGS. 2 through 4, when the reset signal RESET is set to a high level during a first period (an initial reset period) 1, as shown in FIG. 3; the NMOS transistor 21 of the initial value setting circuit 20a is turned on and the output signal OUT has an initial value of a low level (e.g., 0 V). Then, the second inverter 120a inverts the output signal OUT at the low level to output the inverted output signal OUTB at a high level (e.g., VDD). As a result, the output signal OUT and the inverted output signal OUTB of the latch 100a are set to the low level (e.g., 0 V) and the high level (e.g., VDD), respectively, by the initial value setting circuit 20a in the initial reset period 1.

Thereafter, even when the reset signal RESET transits to a low level in a second period 2, the output signal OUT and the inverted output signal OUTB of the latch 100a are maintained at their initial values. In the initial reset period 1 and the second period 2, the second PMOS transistor PT2 is turned on and the second NMOS transistor NT2 is turned off by the output signal OUT initialized to the low level (e.g., 0 V).

When a laser attack has occurred in a third period 3, a leakage current $I_{LEAK}$ of the second NMOS transistor NT2 increases since the second NMOS transistor NT2 is designed to react to a laser at an amount that is increased relative to the second PMOS transistor PT2. In detail, when a laser attack occurs, electron-hole pairs occur in a reverse junction of the second NMOS transistor NT2, inducing the leakage current $I_{LEAK}$. As a result, the voltage of the second node N2 is decreased from the first power supply voltage VDD by a voltage ($I_{LEAK}*R_{PON}$) corresponding to the product of the leakage current $I_{LEAK}$ and a turn-on resistance $R_{PON}$ of the second PMOS transistor PT2. At this time, the leakage current $I_{LEAK}$ is proportional to the size of the junction and the amount of exposure to the laser.

When the leakage current $I_{LEAK}$ occurring due to a laser attack is greater than the turn-on current of the second PMOS transistor PT2, the output signal OUT and the inverted output signal OUTB are inverted. In other words, the inverted output signal OUTB transits to the low level (e.g., 0 V) and the output signal OUT transits to the high level (e.g., VDD).

As described above, when a laser attack has occurred, the output signal OUT of the latch 100a is changed from an initial value (e.g., a low level) to an opposite value (e.g., a high level), so that the laser attack is detected. Since the output signal OUT of the latch 100a changes as soon as a laser is detected in the laser detector 10a, a separate decision circuit is not needed in the laser detector 10a. Accordingly, the laser detector 10a can be formed in a relatively small size, and therefore occupy relatively smaller circuit area.

Figure 5:
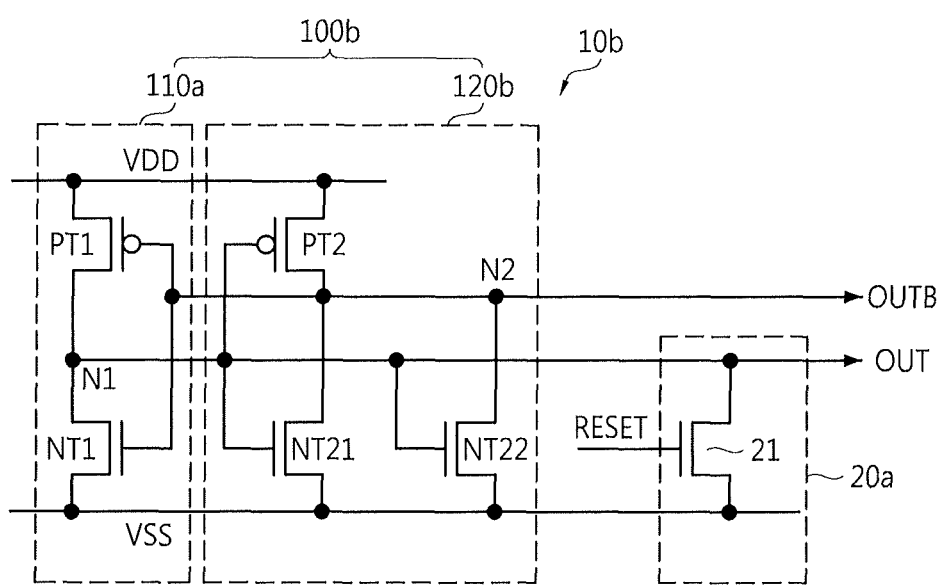
FIG. 5 is a circuit diagram of a laser detector according to other embodiments of the inventive concepts.

FIG. 5 is a circuit diagram of a laser detector 10b according to other embodiments of the inventive concepts. The laser detector 10b illustrated in FIG. 5 is similar to the laser detector 10a illustrated in FIG. 2, and therefore, the description will be focused on the differences between the laser detectors 10a and 10b to avoid redundancy.

The laser detector 10b of the embodiment of FIG. 5 includes a latch 100b and the initial value setting circuit 20a. The latch 100b includes the first inverter 110a and a second inverter 120b. The first inverter 110a is the same as the first inverter 110a illustrated in FIG. 2.

The second inverter 120b is similar to the second inverter 120a illustrated in FIG. 2, with the exception that third and fourth NMOS transistors NT21 and NT22 are connected in parallel between the second node N2 and the second power supply voltage VSS. Gates of the respective NMOS transistors NT21 and NT22 are connected in common to the first node N1.

In the embodiments illustrated in FIG. 5, at least two NMOS transistors are connected in parallel between the second node N2 and the second power supply voltage VSS. This can have the same, or similar, effect of increasing the relative size (e.g., the width of the active region) of the second NMOS transistor NT2 in FIG. 2. Although the size of the second NMOS transistor NT2 illustrated in FIG. 2 is increased by connecting the third and fourth NMOS transistors NT21 and NT22 in parallel in the embodiments illustrated in FIG. 5, in another related embodiment, in a similar manner, at least two PMOS transistors may similarly be connected in parallel between the first power supply voltage VDD and the first node N1 in order to increase the relative effective size of the first PMOS transistor PT1. In still other embodiments, both the first PMOS transistor PT1 illustrated in FIG. 2 may be formed by connecting at least two PMOS transistors in parallel and the second NMOS transistor NT2 may be formed connecting at least two NMOS transistors in parallel.

Figure 6:
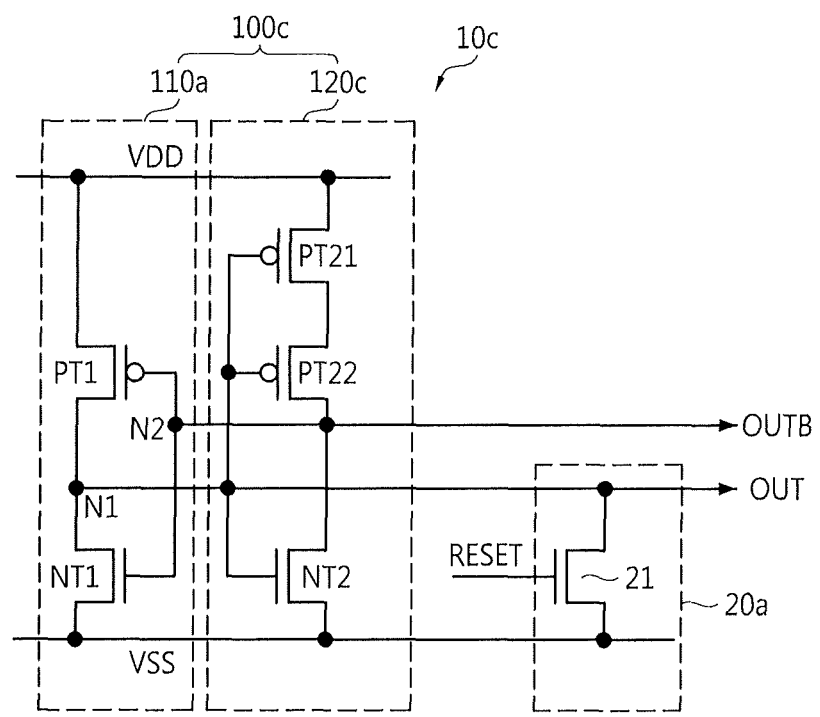
FIG. 6 is a circuit diagram of a laser detector according to still other embodiments of the inventive concepts.

FIG. 6 is a circuit diagram of a laser detector 10c according to still other embodiments of the inventive concepts. The laser detector 10c illustrated in FIG. 6 is similar to the laser detector 10a illustrated in FIG. 2, and therefore, the description will be focused on the differences between the laser detectors 10c and 10b to avoid redundancy.

The laser detector 10c includes a latch 100c and the initial value setting circuit 20a. The latch 100c includes the first inverter 110a and a second inverter 120c. The first inverter 110a is the same as the first inverter 110a illustrated in FIG. 2.

The second inverter 120c is similar in configuration to the second inverter 120a illustrated in FIG. 2, with the exception that third and fourth PMOS transistors PT21 and PT22 are connected in series between the first power supply voltage VDD and the second node N2. Gates of the respective PMOS transistors PT21 and PT22 are connected in common to the first node N1.

In the embodiments illustrated in FIG. 6, at least two PMOS transistors are connected in series between the first power supply voltage VDD and the second node N2, which has the same or similar effect of increasing the effective length of the active region of the second PMOS transistor PT2 in FIG. 2. Although the effective length of the active region of the second PMOS transistor PT2 illustrated in FIG. 2 is increased by connecting the third and fourth PMOS transistors PT21 and PT22 in series in the embodiments illustrated in FIG. 6, in another embodiment at least two NMOS transistors may similarly be connected in series between the first node N1 and the second power supply voltage VSS in order to increase the effective length of the active region of the first NMOS transistor NT1.

In still other embodiments, the second PMOS transistor PT2 illustrated in FIG. 2 may be formed by connecting at least two PMOS transistors in series and the first NMOS transistor NT1 may be formed connecting at least two NMOS transistors in series. In yet other embodiments, the first PMOS transistor PT1 illustrated in FIG. 2 may be formed by connecting at least two PMOS transistors in parallel, the first NMOS transistor NT1 may be formed connecting at least two NMOS transistors in series, the second PMOS transistor PT2 illustrated in FIG. 2 may be formed by connecting at least two PMOS transistors in series, and the second NMOS transistor NT2 may be formed connecting at least two NMOS transistors in parallel.

Figure 7:
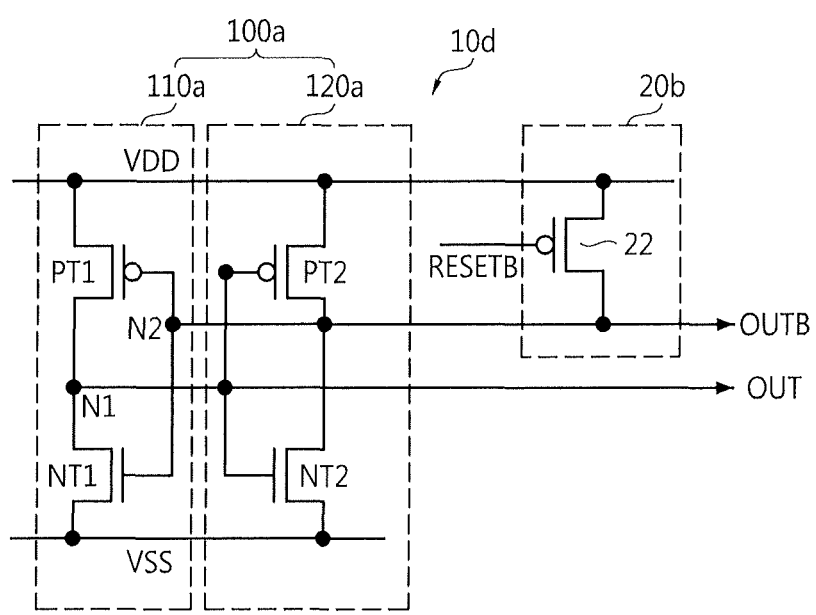
FIG. 7 is a circuit diagram of a laser detector according to further embodiments of the inventive concepts.

FIG. 7 is a circuit diagram of a laser detector 10d according to further embodiments of the inventive concept. The laser detector 10d illustrated in FIG. 7 is similar in many respects to the laser detector 10a illustrated in FIG. 2, and therefore, the description will be focused on the differences between the laser detectors 10d and 10b to avoid redundancy.

Referring to FIG. 7, the laser detector 10d includes the latch 100a and an initial value setting circuit 20b. in some embodiments, the latch 100a is the same as the latch 100a illustrated in FIG. 2.

In the embodiment of FIG. 7, the initial value setting circuit 20b may include a PMOS transistor 22, which is connected between the first power supply voltage VDD and the second node N2 and has a gate receiving a reset bar signal RESETB. The reset bar signal RESETB is an inverted signal of the reset signal RESET.

When the reset signal RESET is set to the high level in the first period 1 shown in FIG. 3, the reset bar signal RESETB is set to a low level. Accordingly, the PMOS transistor 22 of the initial value setting circuit 20b is turned on; and the signal, i.e. the inverted output signal OUTB of the second node N2 has an initial value of the high level (e.g., VDD). Then, the first inverter 110a inverts the inverted output signal OUTB at the high level to output, and latch, the output signal OUT at the low level (e.g., 0 V).

As a result, the output signal OUT and the inverted output signal OUTB of the latch 100a are set to the low level (e.g., 0 V) and the high level (e.g., VDD), respectively, by the initial value setting circuit 20b in the initial reset period 1. Thereafter, even when the reset signal RESET transits to the low level in the second period and the reset bar signal RESETB transits to the high level, the output signal OUT and the inverted output signal OUTB are maintained at the initial values.

FIG. 7 shows embodiments in which only the initial value setting circuit 20a is modified in the embodiments illustrated in FIG. 2. In the embodiments illustrated in FIGS. 5 and 6, the initial value setting circuit 20a may be replaced with the initial value setting circuit 20b illustrated in FIG. 7. Since the initial value setting circuit 20a or 20b needs not to be sensitive to a laser, the transistor 21 or 22 of the initial value setting circuit 20a or 20b may be laid out to be covered with at least one metal layer so as not to be sensitive to laser energy.

Figure 8:
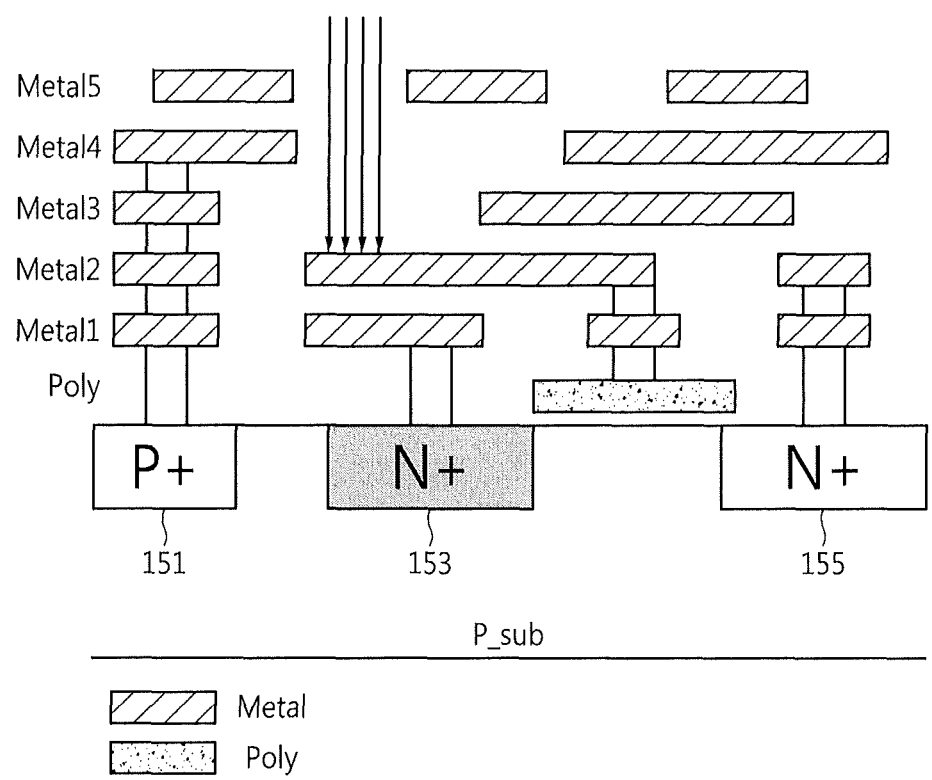
FIG. 8 is a schematic cross-sectional diagram of the vertical layout of a first N-channel metal oxide semiconductor (NMOS) transistor illustrated in FIG. 2.
Figure 9:
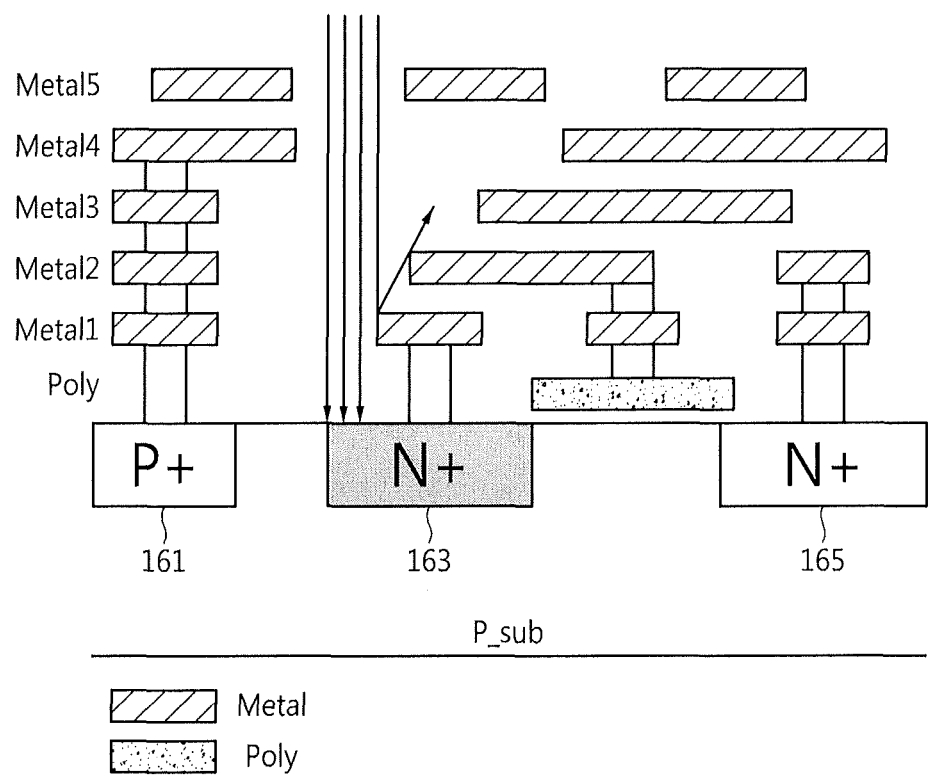
FIG. 9 is a schematic cross-sectional diagram of the vertical layout of a second NMOS transistor illustrated in FIG. 2.

FIG. 8 is a schematic cross-sectional diagram of the vertical layout of the first NMOS transistor NT1 illustrated in FIG. 2. FIG. 9 is a schematic cross-sectional diagram of the vertical layout of the second NMOS transistor NT2 illustrated in FIG. 2.

Referring to FIG. 8, first and second source/drain regions 153 and 155 of the first NMOS transistor NT1 are formed in a semiconductor substrate P_sub. The source/drain regions 153 and 155 may operate as sources or drains according to a voltage applied thereto.

A poly layer may be formed on the source/drain regions 153 and 155 and at least two metal layers Metal1 through Metal5 may be formed on the poly layer. The active region of the first NMOS transistor NT1 may be laid out to be covered in the vertical direction by at least one metal layer so that the first NMOS transistor NT1 does not react to incident laser energy. As shown in FIG. 8, a laser is blocked out from reaching the active region of the substrate by the metal layer Metal2 when a laser attack is made on the first and second source/drain regions 153 and 155. As a result, the first NMOS transistor NT1 does not react to the laser.

Although the layout of the first NMOS transistor NT1 is illustrated in FIG. 8, the second PMOS transistor PT2 may be laid out in a similar manner so that the active region (i.e., the source/drain region) of the second PMOS transistor PT2 is covered in a vertical direction by at least one metal layer. As a result, like the first NMOS transistor NT1, the second PMOS transistor PT2 does not react to the laser, either.

Referring to the embodiment of FIG. 9, first and second source/drain regions 163 and 165 of the second NMOS transistor NT2 are formed in the semiconductor substrate P_sub. A poly layer may be formed on the first and second source/drain regions 163 and 165 and at least two metal layers Metal1 through Metal5 may be formed on the poly layer.

At least part of the active region of the second NMOS transistor NT2 may be laid out so as not to be covered in a vertical direction by a metal layer so that the second NMOS transistor NT2 is partial to reacting with relatively increased sensitivity to incident laser energy. As shown in FIG. 9, a portion of the first source/drain region 163 is laid out so as not to be covered in a vertical direction by a metal layer, so that the second NMOS transistor NT2 reacts with relatively increased sensitivity to energy of an incident laser. In detail, when a laser attack occurs in the region of the first source/drain region; electron-hole pairs are generated in the first source/drain region 163 of the second NMOS transistor NT2 into which a laser is input and the leakage current $I_{LEAK}$ is induced, as described above.

Although only the layout of the second NMOS transistor NT2 is illustrated in FIG. 9, the first PMOS transistor PT1 may be laid similarly out so that part of the active region (i.e., the source/drain region) of the first PMOS transistor PT1 is not covered in a vertical direction by a metal layer. As a result, the first PMOS transistor PT1 can also be configured to react with relatively increased sensitivity to incident laser energy.

As described above, according to some embodiments of the inventive concepts, among transistors forming a latch the transistors predisposed to react well to incident laser energy and the transistors predisposed to not react to the laser are designed to have different horizontal areas (the lengths and/or widths of an active region) and layouts, so that sensitivity for laser detection is increased.

Figure 10:
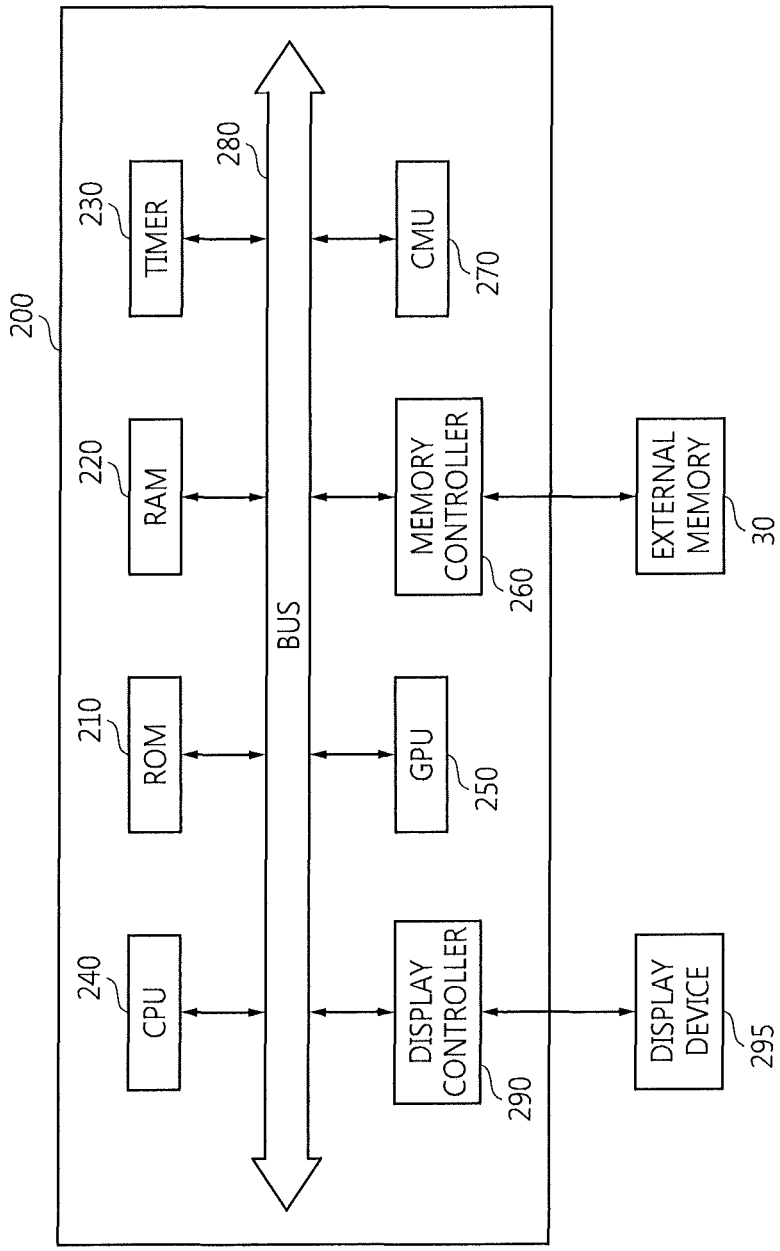
FIG. 10 is a schematic block diagram of an electronic system according to some embodiments of the inventive concepts.

FIG. 10 is a schematic block diagram of an electronic system according to some embodiments of the inventive concepts. Referring to FIG. 10, the electronic system may be implemented as a portable electronic device. The portable electronic device may be a laptop computer, a cellular phone, a smart phone, a tablet personal computer (PC), a personal digital assistant (PDA), an enterprise digital assistant (EDA), a digital still camera, a digital video camera, a portable multimedia player (PMP), a mobile internet device (MID), a wearable computer, an internet of things (IoT) device, or an internet of everything (IoE) device.

The electronic system illustrated in FIG. 10 includes a system on chip (SoC) 200, a display device 295, and an external memory 30. The elements 200, 295, and 30 may be formed in separate chips, respectively. The electronic system may also include other elements such as a camera interface. The electronic system illustrated in FIG. 10 may be a handheld device, a handheld computer, or a mobile device such as an automotive navigation system, a PMP MP3 player, a PDA, a tablet PC, a smart phone, or a mobile phone which can display a still image signal (or a still image) or a moving image signal (or a moving image) on the display device 295.

The display device 295 may include a display driver (not shown) and a display panel (not shown). The display device 295 may display an image signal output from the SoC 200. The display device 295 may be formed of a liquid crystal display (LCD), a light emitting diode (LED) display, an organic LED (OLED) display, or an active-matrix OLED (AMOLED) display.

The external memory 30 stores program instructions executed in the SoC 200. The external memory 30 may also store image data used to display still images or a moving image on the display device 295. The external memory 30 may be formed of volatile or non-volatile memory. The volatile memory may be dynamic random access memory (DRAM), static RAM (SRAM), thyristor RAM (T-RAM), zero capacitor RAM (Z-RAM), or twin transistor RAM (TTRAM). The non-volatile memory may be electrically erasable programmable read-only memory (EEPROM), flash memory, magnetic RAM (MRAM), phase-change RAM (PRAM), or resistive memory.

The SoC 200 controls the external memory 30 and/or the display device 295. The SoC 200 may be called an integrated circuit (IC), a processor, an application processor, a multimedia processor, or an integrated multimedia processor. The SoC 200 may include a central processing circuit (CPU) 240, a read-only memory (ROM) 210, a random access memory (RAM) 220, a timer 230, a display controller 290, a graphics processing unit (GPU) 250, a memory controller 260, a clock management unit (CMU) 270, and a system bus 280. The SoC 200 may also include other elements apart from those elements illustrated in FIG. 10.

The CPU 240, which may be referred to as a processor, may process or execute programs and/or data stored in the external memory 30. For instance, the CPU 240 may process or execute the programs and/or the data in response to an operating clock signal output from a clock signal module (not shown). The CPU 240 may be implemented as a multi-core processor. The multi-core processor is a single computing component with two or more independent actual processors (referred to as cores). Each of the processors reads and executes program instructions.

Programs and/or data stored in the ROM 210, the RAM 220, and/or the external memory 30 may be loaded to a memory (not shown) in the CPU 240 when necessary. The ROM 210 may store permanent programs and/or data. The ROM 210 may be implemented as erasable programmable ROM (EPROM) or EEPROM.

The RAM 220 may temporarily store programs, data, or instructions. The programs and/or data stored in the external memory 30 may be temporarily stored in the RAM 220 according to the control of the CPU 240 or a booting code stored in the ROM 210. The RAM 220 may be implemented as DRAM or SRAM.

The timer 230 may output a count value indicating a time based on an operating clock signal output from the CMU 270. The GPU 250 may convert data read by the memory controller 260 from the external memory 30 into a signal suitable to the display device 295. The CMU 270 generates the operating clock signal. The CMU 270 may include a clock signal generator such as a phase locked loop (PLL), a delay locked loop (DLL), or a crystal oscillator.

The memory controller 260 interfaces with the external memory 30. The memory controller 260 controls the overall operation of the external memory 30 and controls data exchange between a host and the external memory 30. For instance, the memory controller 260 may write data to or read data from the external memory 30 at the request of the host. Here, the host may be a master device such as the CPU 240, the GPU 250, or the display controller 290.

The display controller 290 controls the operations of the display device 295. The display controller 290 receives image data to be displayed on the display device 295 via the system bus 280, converts the image data into a signal (e.g., a signal complying with an interface standard) for the display device 295, and transmits the signal to the display device 295.

The elements 210, 220, 230, 240, 250, 260, 270, and 290 may communicate with one another via the system bus 280. In other words, the system bus 280 connects to each of the elements 210, 220, 230, 240, 250, 260, 270, and 290 to function as a passage for data transmission between elements.

At least one of the elements 210, 220, 230, 240, 250, 260, 270, and 290 illustrated in FIG. 10 may include the laser detector 10. When the laser detector 10 detects a laser attack, it may transmit a detection signal to the CPU 240. The CPU 240 may handle the laser attack (e.g., cut off power to a corresponding element) according to a predetermined scenario. Alternatively, the laser detector 10 may be provided in the external memory 30.

Figure 11A:
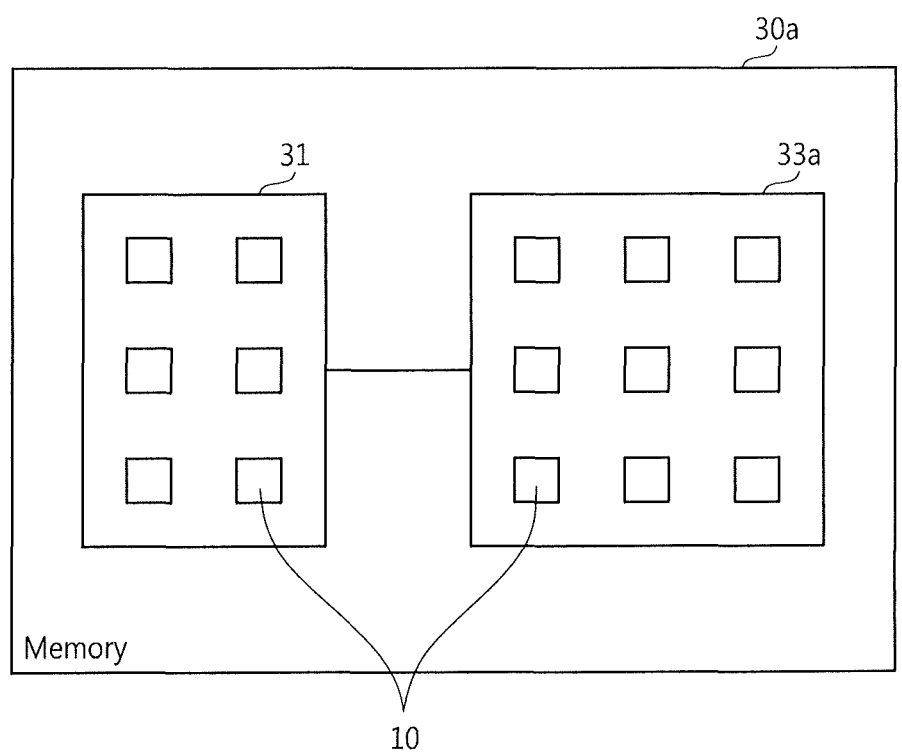
FIG. 11A is a schematic diagram of an example of a memory device illustrated in FIG. 10.

FIG. 11A is a schematic diagram of an example 30*a* of the memory device 30 illustrated in FIG. 10. Referring to FIG. 11, the memory device 30*a* includes an access circuit 31 and a memory cell array 33*a*.

The memory cell array 33*a* includes a plurality of memory cells each of which stores data of at least one bit. The memory cells may be non-volatile memory cells or volatile memory cells. The memory cell array 33*a* may be arranged or formed on one plane (or one layer) in two dimensions. Alternatively, the memory cell array 33*a* may be formed in three dimensions using a wafer stack, a chip stack, or cell stack.

The access circuit 31 accesses the memory cell array 33*a* to perform a data access operation, such as a write operation, a read operation, or an erase operation, according to a command (or a command set) and an address output from an external device, e.g., the memory controller 260. The access circuit 31 and the memory cell array 33*a* each may include a plurality of laser detectors 10. The plurality of laser detectors 10 may be positioned within the access circuit 31 and the memory cell array 33*a* in a distributed fashion.

Figure 11B:
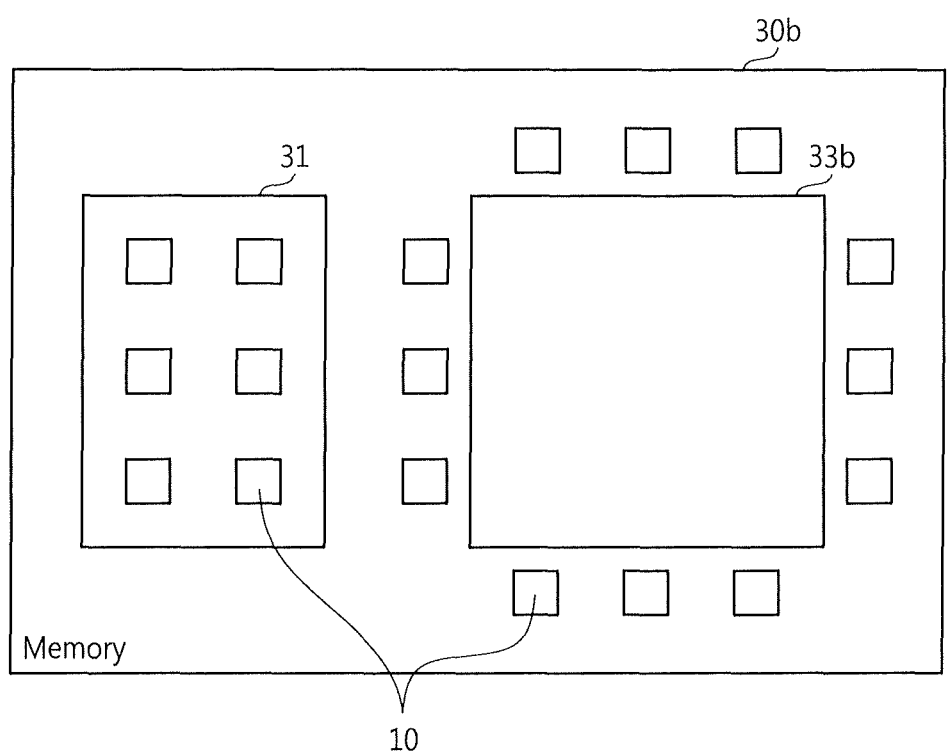
FIG. 11B is a schematic diagram of another example of the memory device illustrated in FIG. 10.

Referring to FIG. 11B, a memory device 30*b* according to other embodiments of the inventive concepts include the access circuit 31 and a memory cell array 33*b*, similar to those depicted in the memory device 30*a* illustrated in FIG. 11B. A difference from the memory cell array 33*a* illustrated in FIG. 11A, lies in that the plurality of laser detectors 10 are placed not within but, rather, around the perimeter of memory cell array 33*b*.

Each of the laser detectors 10 illustrated in FIGS. 11A and 11B may take the form of one of the laser detectors of the type illustrated herein in connection with FIG. 1, 2, 5, 6, or 7. As described above, the laser detector 10 may be set to an initial value and may then output an inverted value of the initial value in response to stimulus from externally applied laser energy, thereby detecting a laser attack.

Figure 12:
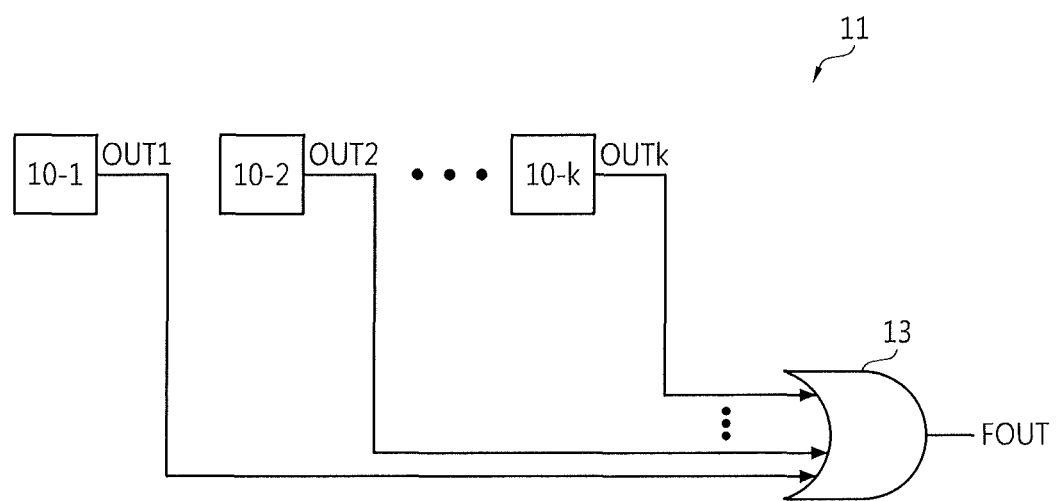
FIG. 12 is a schematic diagram of a laser detection module according to some embodiments of the inventive concepts.

FIG. 12 is a schematic diagram of a laser detection module 11 according to some embodiments of the inventive concept. Referring to FIG. 12, the laser detection module 11 may include a plurality of laser detectors 10-1 through 10-*k* (where "k" is an integer of at least 2) and a logical operator 13. Each of the laser detectors 10-1 through 10-*k* may be of the type of those laser detectors illustrated in FIG. 1, 2, 5, 6, or 7.

The logical operator 13 may perform an OR operation on output signals OUT1 through OUTk respectively output from the laser detectors 10-1 through 10-*k* to output a detection signal FOUT. Each of the output signals OUT1 through OUTk may be set to have an initial value of a low level (e.g., 0 V). Therefore, the detection signal FOUT output from the logical operator 13 may also have an initial value of a low level (e.g., 0 V).

When a laser attack occurs, at least one of the laser detectors 10-1 through 10-*k* may invert a corresponding one of the output signals OUT1 through OUTk in response to a laser. In other words, when a laser attack is detected by at least one of the laser detectors 10-1 through 10-*k*, at least one output signal OUT among the output signals OUT1 through OUTk is inverted to a high level (e.g., VDD). Accordingly, the detection signal FOUT output from the logical operator 13 is also inverted to a high level (e.g., VDD). The detection signal FOUT may be transmitted to the memory controller 260 or the CPU 240 illustrated in FIG. 10 and the memory controller 260 or the CPU 240 may take a necessary measure like turning off the power of an involved element (e.g., memory) in response to the detection signal FOUT.

Although, in the example embodiment of FIG. 12, the logical operator 13 is implemented as an OR logical operator ORing the output signals OUT1 through OUTk, the logical operator 13 may optionally be implemented as an AND logical operation ANDing the output signals OUT1 through OUTk or ANDing inverted signals of the output signals OUT1 through OUTk, i.e., inverted output signals. Alternatively other logical operators may be applied.

The memory device 30a or 30b illustrated in FIG. 11A or 11B may include at least one logical operator 13 illustrated in FIG. 12. For instance, a plurality of laser detectors may be divided into at least two groups and the logical operator 13 may be connected to each of the groups, so that the detection signal FOUT may be representative of the output of groups of laser detectors.

Figure 13:
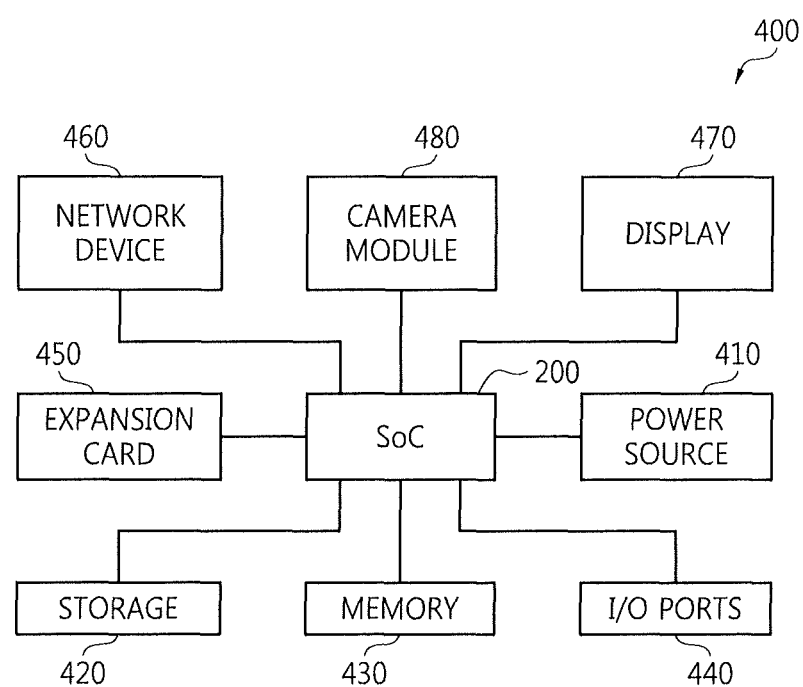
FIG. 13 is a block diagram of an electronic system according to other embodiments of the inventive concepts.

FIG. 13 is a block diagram of an electronic system 400 according to other embodiments of the inventive concepts. The electronic system 400 may be implemented as a PC, a data server, a laptop computer, or a portable device. The portable device may be a mobile telephone, a smart phone, a tablet PC, a PDA, an EDA, a digital still camera, a digital video camera, a PMP, a personal navigation device or portable navigation device (PND), a handheld game console, or an e-book.

The electronic system 400 may include the SoC 200, a power source 410, a storage 420, a memory 430, I/O ports 440, an expansion card 450, a network device 460, and a display 470. The electronic system 400 may also include a camera module 480.

The SoC 200 may control the operation of at least one of the elements 410 through 480. The SoC 200 may be the SoC 200 illustrated in FIG. 10.

The power source 410 may supply an operating voltage to at least one of the elements 200 and 420 through 480. The storage 420 may be implemented as a hard disk drive (HDD) or a solid state drive (SSD).

The memory 430 may be implemented as a volatile or non-volatile memory. A memory controller (not shown), which controls a data access operation such as a read operation, a write operation (or a program operation), or an erase operation on the memory 430, may be integrated into or embedded in the SoC 200. Alternatively, the memory controller (not shown) may be provided between the SoC 200 and the memory 430.

The I/O ports 440 may receive data transmitted to the electronic system 400 or transmit data from the electronic system 400 to an external device. For instance, the I/O ports 440 may include a port for connection with a pointing device such as a computer mouse, a port for connection with a printer, or a port for connection with a universal serial bus (USB) drive.

The expansion card 450 may be implemented as a secure digital (SD) card or a multimedia card (MMC). The expansion card 450 may be a subscriber identity module (SIM) card or a universal SIM (USIM) card.

The network device 460 enables the electronic system 400 to be connected with a wired or wireless network. The display 470 displays data output from the storage 420, the memory 430, the I/O ports 440, the expansion card 450, or the network device 460.

The camera module 480 is a module that can convert an optical image into an electrical image. Accordingly, the electrical image output from the camera module 480 may be stored in the storage 420, the memory 430, or the expansion card 450. In addition, the electrical image output from the camera module 480 may be displayed through the display 470.

At least one of the elements 200 and 410 through 480 illustrated in FIG. 13 may include the laser detector 10 described above.

Figure 14:
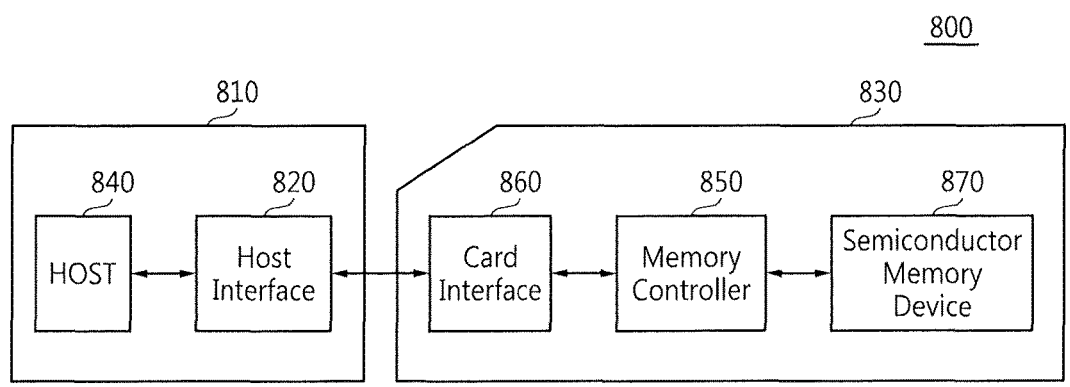
FIG. 14 is a block diagram of an electronic system according to further embodiments of the inventive concepts.

FIG. 14 is a block diagram of an electronic system 800 according to further embodiments of the inventive concepts. Referring to FIG. 14, the electronic system 800 may be formed of a host computer 810 and a memory card or smart card. The electronic system 800 includes the host computer 810 and a memory card 830.

The host computer 810 includes a host 840 and a host interface 820. The memory card 830 includes a memory controller 850, a card interface 860, and a semiconductor memory device 870. The memory controller 850 may control data exchange between the semiconductor memory device 870 and the card interface 860.

The card interface 860 may be an SD card interface or an MMC interface but is not restricted thereto. The card interface 860 may support a USB protocol and an inter-chip (IC)-USB protocol. Here, the card interface 860 may refer to a hardware component supporting a protocol used by the host computer 810, a software component installed in the hardware component, or a signal transmission method.

When the memory card 830 is mounted on the host computer 810, the card interface 860 interfaces data between the host 840 and the memory controller 850 according to a protocol of the host 840. When the memory card 830 is connected to the host interface 820 of the host computer 810 such as a PC, a tablet PC, a digital camera, a digital audio player, a mobile phone, a console video game hardware, or a digital set-top box; the host interface 820 may perform data communication with the semiconductor memory device 870 through the card interface 860 and the memory controller 850 according to the control of the host 840.

The memory card 830 may include at least one laser detector 10 according to some embodiments of the inventive concepts. Alternatively, the memory card 830 may include the laser detection module 11 of the type illustrated in FIG. 13.

As described above, according to some embodiments of the inventive concepts, a laser detector is implemented using a latch, so that the laser detector can be formed in a relatively small size. In addition, the laser detector generates a different output signal as soon as it detects a laser, so that the size of the laser detector is reduced since the laser detector does not require a decision circuit for a sensing circuit. Furthermore, among transistors forming the latch, a transistor configured to react with relatively increased sensitivity to an incident laser energy and a transistor configured to not react to incident laser energy are designed to be different in size, different in layout, or different in size and layout, so that laser detection performance is increased.

While the inventive concepts have been particularly shown and described with reference to exemplary embodiments thereof, it will be understood by those of ordinary skill in the art that various changes in forms and details may be made herein without departing from the spirit and scope of the inventive concepts as defined by the following claims.

What is claimed is:

1. A laser detector for detecting a laser attack, the laser detector comprising:

a latch comprising a first inverter configured to invert an inverted output signal to generate an output signal and a second inverter configured to receive the output signal and to generate the inverted output signal; and an initial value setting circuit configured to set an initial value of at least one of the output signal and the inverted output signal, wherein the first inverter comprises:
- a first transistor controlled to be initially turned off by the initial value; and
- a second transistor controlled to be initially turned on by the initial value, and and wherein the second inverter comprises:
- a third transistor controlled to be initially turned on by the initial value; and
- a fourth transistor controlled to be initially turned off by the initial value.

2. The laser detector of claim 1, wherein the first and third transistors comprise P-channel metal oxide semiconductor (PMOS) transistors and the second and fourth transistors comprise N-channel metal oxide semiconductor (NMOS) transistors.

3. The laser detector of claim 2, wherein a ratio of width to length of an active region of the first transistor is greater than a ratio of width to length of an active region of the third transistor and a ratio of width to length of an active region of the second transistor is less than a ratio of width to length of an active region of the fourth transistor.

4. The laser detector of claim 2, wherein an active region of each of the second and third transistors is positioned to be covered in a vertical direction by a metal layer and at least a portion of an active region of each of the first and fourth transistors is positioned to not be covered in a vertical direction by the metal layer.

5. The laser detector of claim 2, wherein the first transistor is connected between a first power supply voltage and a first node and has a gate receiving the inverted output signal, the second transistor is connected between the first node and a second power supply voltage and has a gate receiving the inverted output signal, the third transistor is connected between the first power supply voltage and a second node and has a gate receiving the output signal, and the fourth transistor is connected between the second node and the second power supply voltage and has a gate receiving the output signal.

6. The laser detector of claim 5, wherein the initial value setting circuit comprises a transistor connected between one of the first and second nodes and the second power supply voltage to operate in response to a reset signal.

7. The laser detector of claim 5, wherein the initial value setting circuit comprises a transistor connected between the first power supply voltage and one of the first and second nodes to operate in response to a reset signal.

8. The laser detector of claim 5, wherein the fourth transistor comprises at least two transistors connected in parallel between the second node and the second power supply voltage.

9. The laser detector of claim 5, wherein the third transistor comprises at least two transistors connected in series between the first power supply voltage and the second node.

10. The laser detector of claim 1, wherein an active region of the first transistor is larger than an active region of the second transistor.

11. The laser detector of claim 1, wherein an active region of the fourth transistor is larger than an active region of the third transistor.

12. The laser detector of claim 1, wherein active regions of the first and fourth transistors are larger than active regions of the second and third transistors.

13. The laser detector of claim 1, wherein a ratio of width to length of an active region of the first transistor is greater than a ratio of width to length of an active region of the third transistor.

14. The laser detector of claim 13, wherein a ratio of width to length of an active region of the second transistor is less than a ratio of width to length of an active region of the fourth transistor.

15. The laser detector of claim 1, wherein an active region of each of the second and third transistors is positioned to be covered in a vertical direction by a metal layer.

16. The laser detector of claim 15, wherein at least a portion of an active region of each of the first and fourth transistors is positioned to not be covered in a vertical direction by the metal layer.

* * * * *